United States Patent
Niikura et al.

(10) Patent No.: US 9,342,242 B2
(45) Date of Patent: May 17, 2016

(54) INPUT DEVICE AND INPUT METHOD, INFORMATION PROCESSING DEVICE AND INFORMATION PROCESSING METHOD, INFORMATION PROCESSING SYSTEM AND PROGRAM

(75) Inventors: Hideo Niikura, Tokyo (JP); Kazuyuki Yamamoto, Kanagawa (JP); Naoki Fukino, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1027 days.

(21) Appl. No.: 12/631,948

(22) Filed: Dec. 7, 2009

(65) Prior Publication Data

US 2010/0182235 A1 Jul. 22, 2010

(30) Foreign Application Priority Data

Jan. 19, 2009 (JP) .................................. 2009-008745

(51) Int. Cl.
*G06F 3/033* (2013.01)
*G06F 3/0489* (2013.01)
*G06F 3/02* (2006.01)
*G06F 3/0346* (2013.01)
*H04N 5/44* (2011.01)
*H04N 21/422* (2011.01)

(52) U.S. Cl.
CPC .............. *G06F 3/04892* (2013.01); *G06F 3/02* (2013.01); *G06F 3/0346* (2013.01); *H04N 5/4403* (2013.01); *H04N 21/42222* (2013.01); *H04N 2005/4428* (2013.01)

(58) Field of Classification Search
None
See application file for complete search history.

(56) References Cited

U.S. PATENT DOCUMENTS

| | | | | |
|---|---|---|---|---|
| 6,100,875 | A * | 8/2000 | Goodman et al. | 345/163 |
| 6,724,368 | B2 * | 4/2004 | Strubbe | 345/158 |
| 2002/0049978 | A1 * | 4/2002 | Rodriguez et al. | 725/86 |
| 2003/0128187 | A1 * | 7/2003 | Strubbe | 345/157 |
| 2007/0211050 | A1 | 9/2007 | Ohta | |
| 2008/0143673 | A1 * | 6/2008 | Park | 345/157 |

(Continued)

FOREIGN PATENT DOCUMENTS

| | | | | |
|---|---|---|---|---|
| JP | 05-181603 | * | 7/1993 | G06F 3/033 |
| JP | 2003-5904 | | 1/2003 | |

(Continued)

OTHER PUBLICATIONS

Japanese Office Action issued Dec. 2, 2010, in Patent Application No. 2009-008745.

(Continued)

*Primary Examiner* — Christopher R Lamb
(74) *Attorney, Agent, or Firm* — Oblon, McClelland, Maier & Neustadt, L.L.P.

(57) ABSTRACT

An input device includes an operation unit that is held by a user and operated in a three-dimensional free space to remotely operate an information processing device, a directional button that is provided on the operation unit and operated by the user to point in a direction, and a transmission unit that, when the directional button is operated while the operation unit is being operated in the free space, transmits information corresponding to the operation in the free space and information corresponding to the operated directional button to the information processing device so that an object image linearly moves by only an amount corresponding to a directional component of the directional button out of an operation amount in the free space after the operation of the directional button.

9 Claims, 16 Drawing Sheets

(56) References Cited

U.S. PATENT DOCUMENTS

| | | | |
|---|---|---|---|
| 2009/0009471 A1* | 1/2009 | Yamamoto | G06F 3/0346 345/158 |
| 2009/0128484 A1* | 5/2009 | Hanyu | 345/156 |

FOREIGN PATENT DOCUMENTS

| | | |
|---|---|---|
| JP | 2007-241734 | 9/2007 |
| JP | 2008-287810 | 11/2008 |

OTHER PUBLICATIONS

U.S. Appl. No. 12/628,526, filed Dec. 1, 2009, Yamamoto.
U.S. Appl. No. 12/636,938, filed Dec. 14, 2009, Yamamoto.
U.S. Appl. No. 12/637,005, filed Dec. 14, 2009, Yamamoto, et al.
U.S. Appl. No. 12/687,401, filed Jan. 14, 2010, Yamamoto, et al.

* cited by examiner

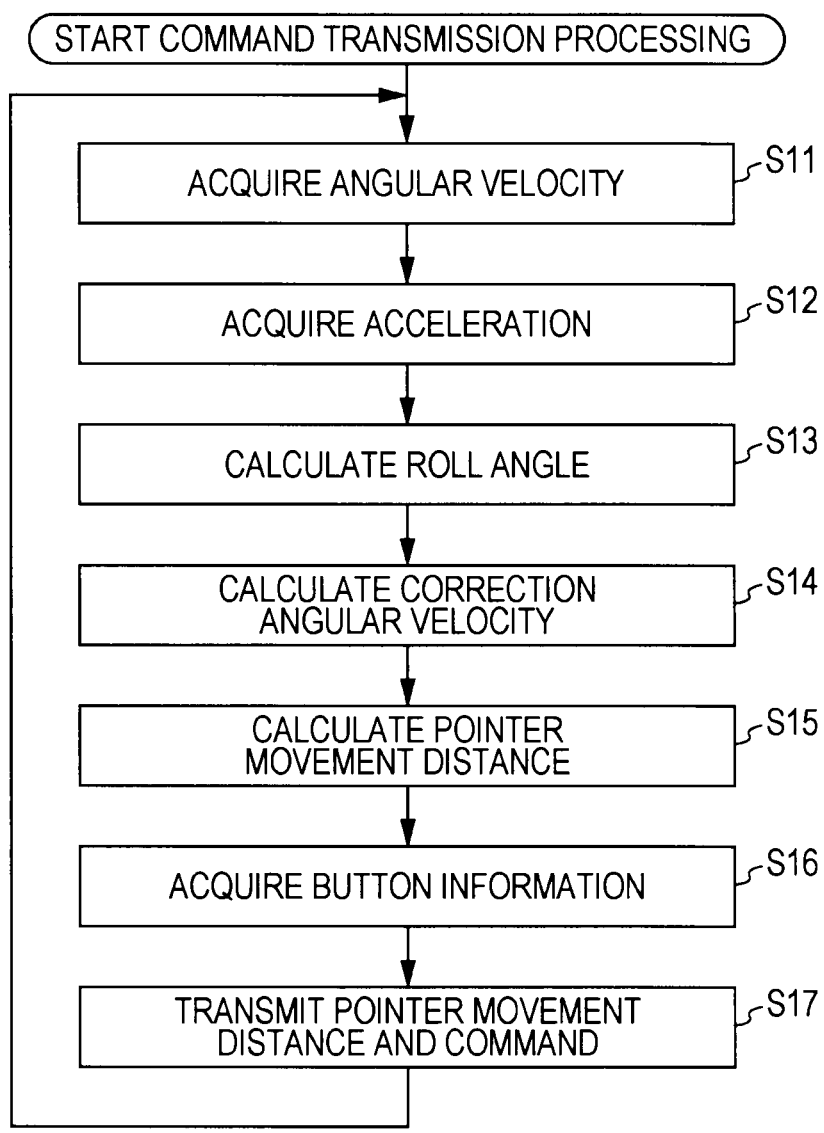

INPUT DEVICE AND INPUT METHOD, INFORMATION PROCESSING DEVICE AND INFORMATION PROCESSING METHOD, INFORMATION PROCESSING SYSTEM AND PROGRAM

BACKGROUND OF THE INVENTION

1. Field of the Invention

The present invention relates to an input device and input method, an information processing device and information processing method, an information processing system, and a program, and more particularly, an input device and method, an information processing device and method, an information processing system, and a program, which realize excellent operability.

2. Description of the Related Art

Mice are generally used to move a pointer on a personal computer. Manipulating a mouse on a desk in a direction moves a pointer in the direction.

When a mouse is moved in a predetermined direction, a ball in the mouse rolls in the direction in which the mouse is moved. The rotation speed and direction of the ball are detected, and the movement of a pointer is controlled according to the detected values of the speed and direction.

In contrast to mice operated on desks, mice operable in a three-dimensional free space in any direction, so called air mice, have been proposed (e.g., Japanese Unexamined Patent Application Publication No. 2007-241734). Air mice detect the operational speed and direction by using a built-in acceleration sensor and angular velocity sensor.

The use of an air mouse that can be moved in any direction facilitates the movement of the pointer in any direction including a diagonal direction.

SUMMARY OF THE INVENTION

However, although air mice have an advantage of moving the pointer easily in any direction, they have difficulties in steadily moving the pointer in one direction due to a user's unstable hand movement.

The present invention has been made in view of the problem and realizes excellent operability.

According to an embodiment of the present invention, an input device includes an operation unit that is held by a user and operated in a three-dimensional free space to remotely operate an information processing device, a directional button that is provided on the operation unit and operated by the user to point in a direction, and a transmission unit that, when the directional button is operated while the operation unit is being operated in the free space, transmits information corresponding to the operation in the free space and information corresponding to the operated directional button to the information processing device so that an object image linearly moves by only an amount corresponding to a directional component of the directional button out of an operation amount in the free space after the operation of the directional button.

According to the embodiment of the present invention, an information processing device includes a receiving unit that receives signals from an operation unit, the operation unit being held by a user and operated in a three-dimensional free space to remotely operate the information processing device and being provided with a directional button that is operated by the user to point in a direction, and a control unit that controls an object image so that, when the directional button is operated while the operation unit is being operated in the free space, the object image linearly moves by an amount corresponding to a directional component of the directional button out of an operation amount in the free space after the operation of the directional button.

According to the embodiment of the present invention, an information processing system includes an input device and an information processing device that is controlled by a remote control signal from the input device. The input device includes an operation unit that is held by a user and operated in a three-dimensional free space to remotely operate the information processing device and is provided with a directional button that is operated by the user to point in a direction, and a transmission unit that transmits information corresponding to the operation of the operation unit in the free space and information corresponding to the operated directional button. The information processing device includes a control unit that controls an object image so that, when the directional button is operated while the operation unit is being operated in the free space, the object image linearly moves by only an amount corresponding to a directional component of the directional button out of an operation amount in the free space after the operation of the directional button.

According to the embodiment of the present invention, an input device includes an operation unit that is held by a user and operated in a three-dimensional free space to remotely operate an information processing device, a directional button that is provided on the operation unit and operated by the user to point in a direction, and a transmission unit that, when the directional button is operated while the operation unit is being operated in the free space, transmits information corresponding to the operation in the free space and information corresponding to the operated directional button to the information processing device so that an object image linearly moves onto another image positioned in the direction instructed by the directional button.

According to the embodiment of the present invention, an information processing device includes a receiving unit that receives signals from an operation unit, the operation unit being held by a user and operated in a three-dimensional free space to remotely operate the information processing device and being provided with a directional button that is operated by the user to point in a direction, and a control unit that controls an object image so that, when the directional button is operated while the operation unit is being operated in the free space, the object image linearly moves onto another image positioned in the direction instructed by the directional button.

According to the embodiment of the present invention, an information processing system includes an input device and an information processing device that is controlled by a remote control signal from the input device. The input device includes an operation unit that is held by a user and operated in a three-dimensional free space to remotely operate the information processing device and is provided with a directional button that is operated by the user to point in a direction, and a transmission unit that transmits information corresponding to the operation of the operation unit in the free space and information corresponding to the operated directional button. The information processing device includes a control unit that controls an object image so that, when the directional button is operated while the operation unit is being operated in the free space, the object image linearly moves onto another image positioned in the direction instructed by the directional button.

According to the embodiment of the present invention, an input device includes an operation unit that is held by a user and operated in a three-dimensional free space to remotely operate an information processing device and a directional button that is provided on the operation unit and operated by the user to point in a direction. The input device also includes a transmission unit that, when the directional button is operated while the operation unit is being operated in the free space, transmits information corresponding to the operation of the operation unit in the free space and information corresponding to the operated directional button to the information processing device so that an object image linearly moves by only an amount corresponding to a directional component of the directional button out of an operation amount in the free space after the operation of the directional button.

According to the embodiment of the present invention, a receiving unit receives signals from an operation unit, the operation unit being held by a user and operated in a three-dimensional free space to remotely operate the information processing device and being provided with a directional button that is operated by the user to point in a direction, and a control unit controls an object image so that, when the directional button is operated while the operation unit is being operated in the free space, the object image linearly moves by an amount corresponding to a directional component of the directional button out of an operation amount in the free space after the operation of the directional button.

According to the embodiment of the present invention, an input device includes an operation unit that is held by a user and operated in a three-dimensional free space to remotely operate the information processing device and is provided with a directional button that is operated by the user to point in a direction, and a transmission unit that transmits information corresponding to the operation of the operation unit in the free space and information corresponding to the operated directional button. According to the embodiment of the present invention, the information processing device includes a control unit that controls an object image so that, when the directional button is operated while the operation unit is being operated in the free space, the object image linearly moves by an amount corresponding to a directional component of the directional button out of an operation amount in the free space after the operation of the directional button.

According to the embodiment of the present invention, an input device includes an operation unit that is held by a user and operated in a three-dimensional free space to remotely operate an information processing device and a directional button that is provided on the operation unit and operated by the user to point in a direction. The input device also includes a transmission unit that, when the directional button is operated while the operation unit is being operated in the free space, transmits information corresponding to the operation in the free space and information corresponding to the operated directional button to the information processing device so that an object image linearly moves onto another image positioned in the direction instructed by the directional button.

According to the embodiment of the present invention, a receiving unit receives signals from an operation unit, the operation unit being held by a user and operated in a three-dimensional free space to remotely operate the information processing device and being provided with a directional button that is operated by the user to point in a direction, and a control unit controls an object image so that, when the directional button is operated while the operation unit is being operated in the free space, the object image linearly moves onto another image positioned in the direction instructed by the directional button.

According to the embodiment of the present invention, an input device includes an operation unit that is held by a user and operated in a three-dimensional free space to remotely operate the information processing device and is provided with a directional button that is operated by the user to point in a direction, and a transmission unit that transmits information corresponding to the operation of the operation unit in the free space and information corresponding to the operated directional button. According to the embodiment of the present invention, the information processing device includes a control unit that controls an object image so that, when the directional button is operated while the operation unit is being operated in the free space, the object image linearly moves onto another image positioned in the direction instructed by the directional button.

According to the aforementioned embodiment of the present invention, it is possible to realize excellent operability.

BRIEF DESCRIPTION OF THE DRAWINGS

FIG. 8 is a flow chart that describes command transmission processing.

DESCRIPTION OF THE PREFERRED EMBODIMENTS

The following are descriptions of the best modes for carrying out the invention (hereinafter, referred to as "embodiment"). The descriptions will be made in the following order.

1. First embodiment (system configuration)
2. First embodiment (input device configuration)
3. First embodiment (functional configuration of arithmetic unit)
4. First embodiment (object image)
5. First embodiment (command transmission processing of input device)

6. First embodiment (display control processing 1 of image display)
7. First embodiment (display control processing 2 of image display)
8. Modifications

1. First Embodiment

System Configuration

Figure 1:
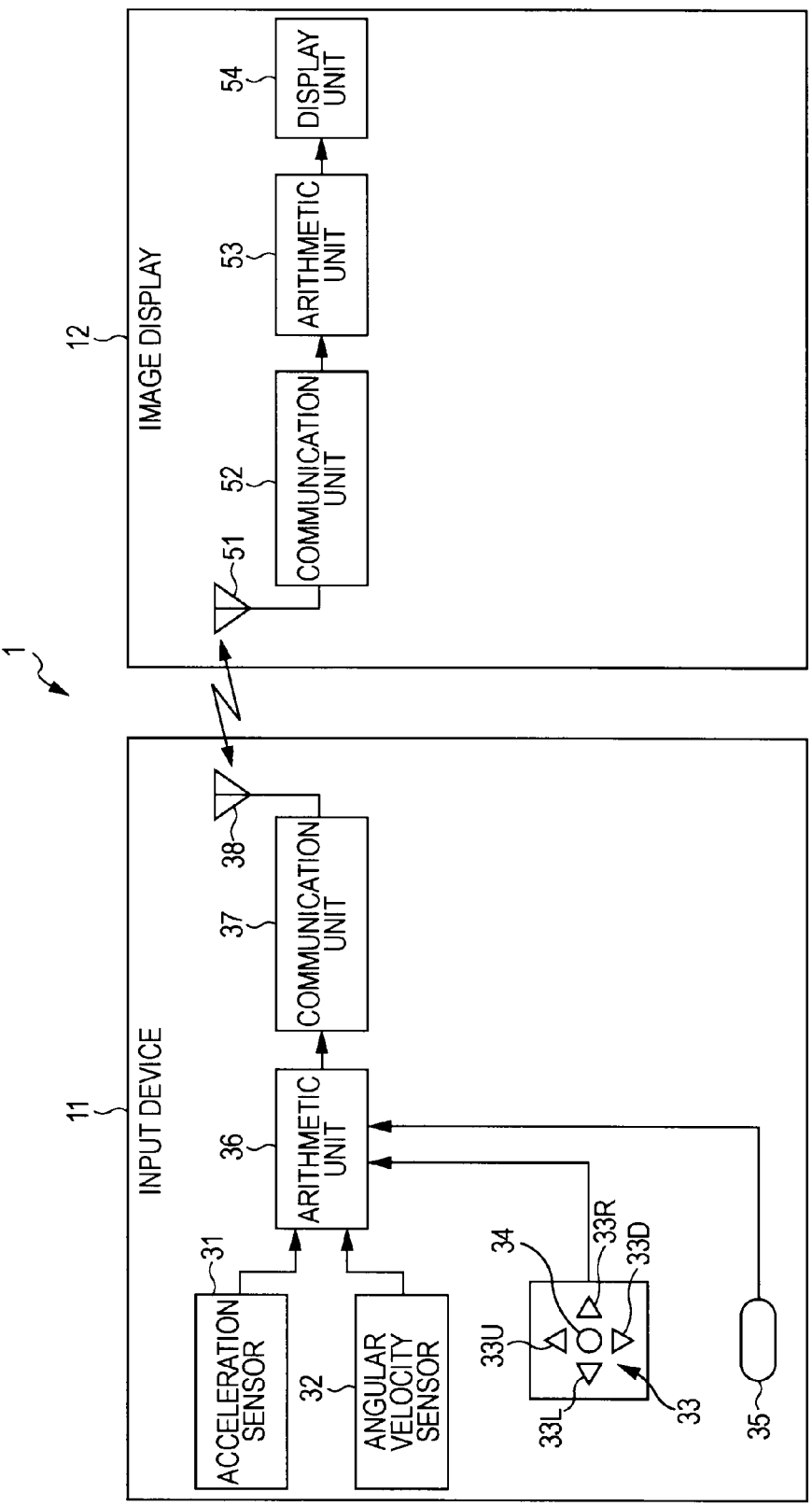
FIG. 1 is a block diagram showing the configuration of an information processing system according to an embodiment of the present invention.

FIG. 1 is a block diagram illustrating the configuration of an information processing system according to an embodiment of the present invention.

The information processing system 1 includes an image display 12 serving as an information processing device and an input device 11 serving as a pointing device or remote controller for remotely controlling the image display 12.

The input device 11 includes an acceleration sensor 31, an angular velocity sensor 32, directional buttons 33, a confirmation button 34, a drag button 35, an arithmetic unit 36, a communication unit 37, and an antenna 38.

The input device 11 is the so-called air remote controller. The acceleration sensor 31 and angular velocity sensor 32 detect the acceleration and angular velocity, respectively, of the input device 11 that have been moved in a desired direction in the three-dimensional space.

The directional buttons 33 include an up button 33U, a down button 33D, a left button 33L and a right button 33R. These buttons are pressed by a user to move a pointer, which is an object image, upward, downward, leftward or rightward. The confirmation button 34 is located in the center of the directional buttons 33 and is pressed to confirm a selection.

The drag button 35 is used to drag movable objects. Specifically, when it is necessary to move a movable object in a predetermined direction, the input device 11 that directs the pointer on the movable object is moved in the predetermined direction in the free space while the drag button 35 is being pressed.

The arithmetic unit 36 is, for example, a microprocessor, and detects operational results of the acceleration sensor 31, angular velocity sensor 32, directional buttons 33, confirmation button 34 and drag button 35. Signals, which represent commands or the like corresponding to the detected results, are amplified and modulated by the communication unit 37 and transmitted by radio waves via the antenna 38 to the image display 12.

The image display 12 is, for example, a television receiver, and includes an antenna 51, a communication unit 52, an arithmetic unit 53 and a display unit 54.

The antenna 51 receives the radio waves from the input device 11. The communication unit 52 amplifies and demodulates the signals received via the antenna 51. The arithmetic unit 53 is, for example, a microprocessor, and executes predetermined operations in accordance with the signals from the communication unit 52. The display unit 54 displays images. Although it is not illustrated in FIG. 1, the image display 12 has a function of receiving television broadcasts and displaying the television pictures on the display unit 54.

[Input Device Configuration]

Figure 2:
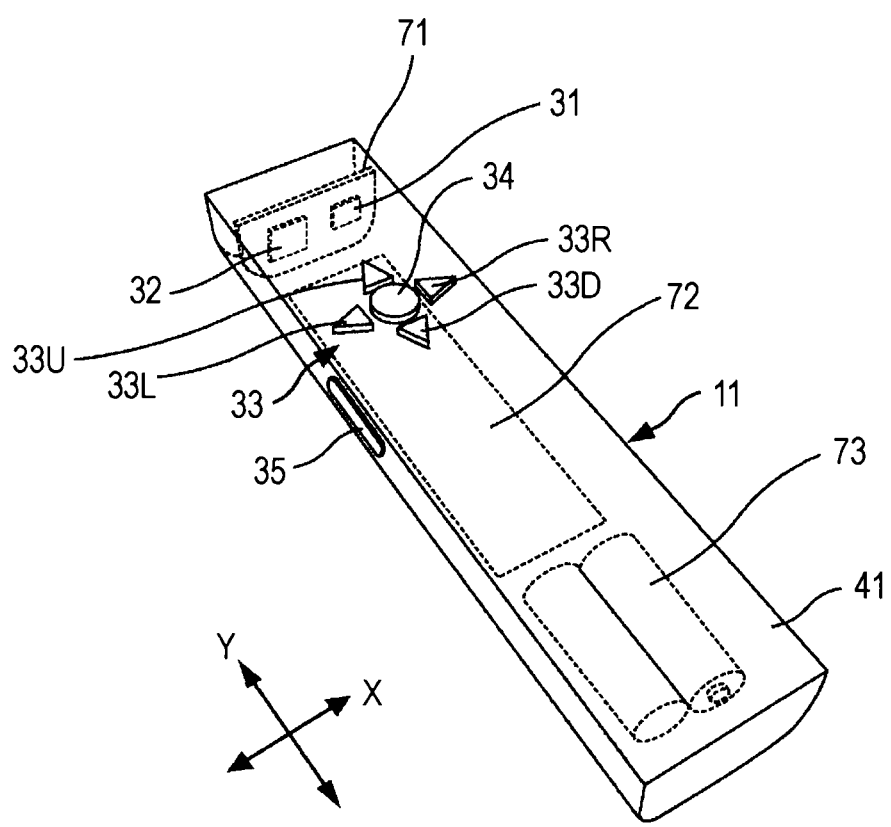
FIG. 2 is a perspective view of the external configuration of an input device.

FIG. 2 is a perspective view of the external configuration of the input device. The input device 11 has a body 41 serving as an operation unit operable by a user to generate operation signals for controlling the information processing device. The body 41 has the directional buttons 33 and confirmation button 34 on its upper surface and the drag button 35 on its left side surface.

Attached at the top-end in the interior of the body 41 is a sensor circuit board 71 on which the acceleration sensor 31 and angular velocity sensor 32 are mounted. In a middle portion on the back side of the interior of the body 41, an arithmetic/communication circuit board 72 is mounted on which the arithmetic unit 36 and communication unit 37 are arranged. Batteries 73, which supply power necessary for each component, are housed in the proximity of the bottom in the interior of the body 41.

Figure 3:
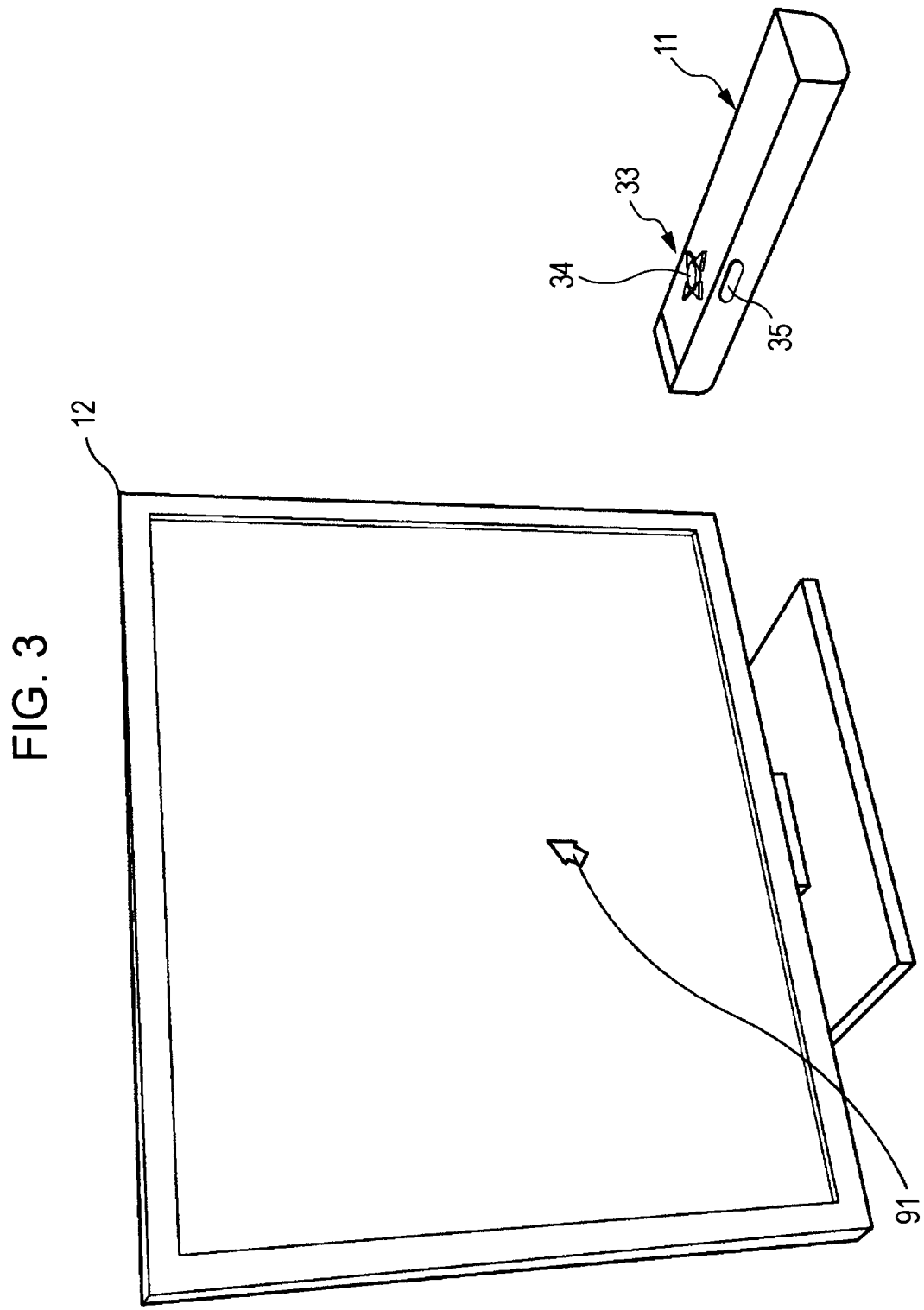
FIG. 3 is a perspective view for explaining the usage of the input device.

FIG. 3 is a perspective view for explaining the usage of the input device. As shown in FIG. 3, a user firmly holds the input device 11 while aiming its top at the image display 12, and moves the input device 11 in any direction in three-dimensional space and presses the directional buttons 33. These actions cause a pointer 91, which is an object image, to move in the operated direction.

Figure 4:
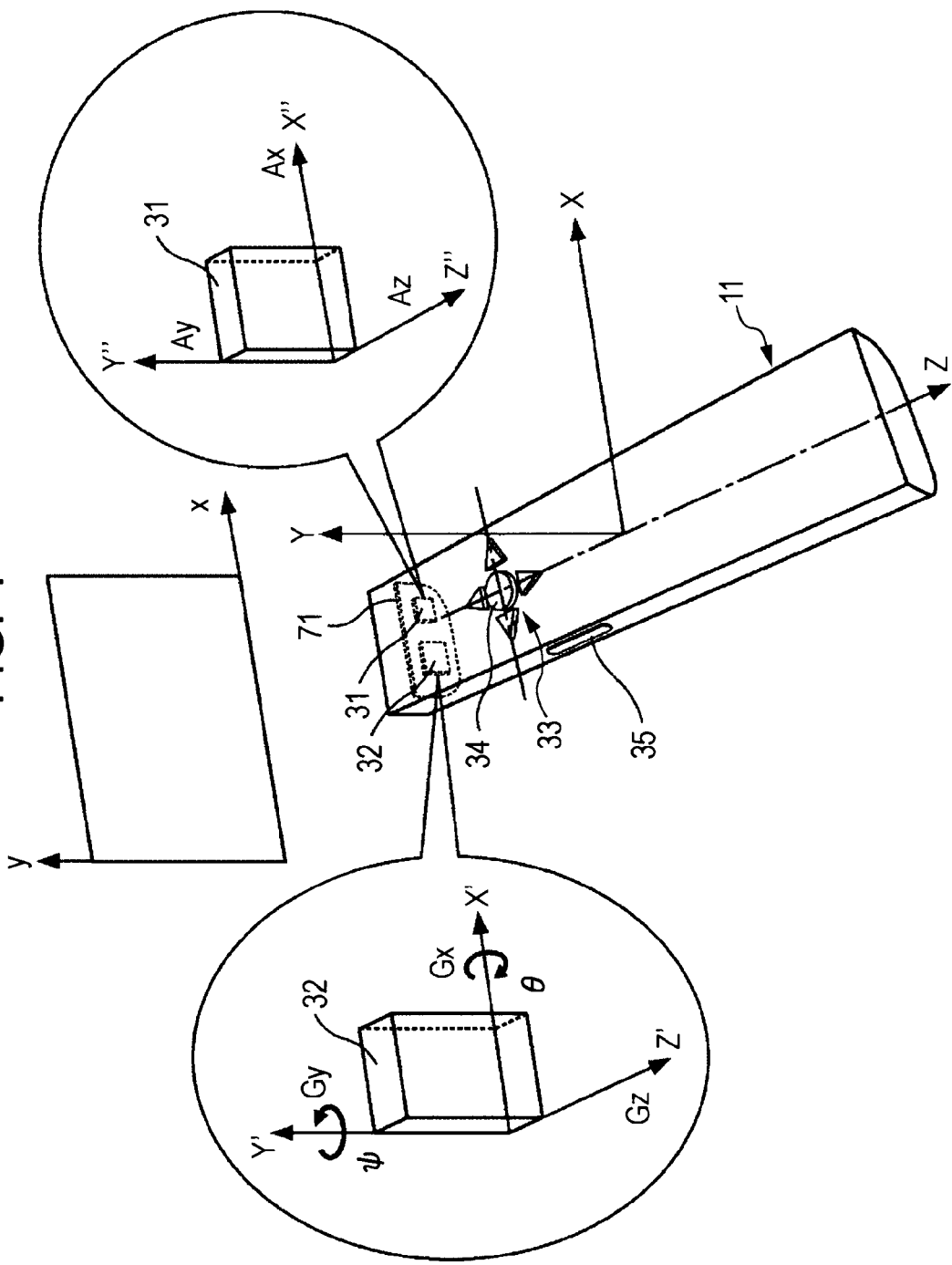
FIG. 4 illustrates axes of sensors.

FIG. 4 illustrates axes of the sensors. The angular velocity sensor 32 and acceleration sensor 31 attached at the top of the input device 11 are fabricated using MEMS (Micro Electro Mechanical Systems) technology. X, Y and Z indicate absolute axes that are orthogonal to each other in the three-dimensional free space. The Y axis is a vertical axis, whereas the X axis and Z axis are axes lying in a horizontal plane. The Z axis points toward the user. X', Y' and Z' indicate orthogonal axes of the angular velocity sensor 32, and X", Y" and Z" indicate orthogonal axes of acceleration sensor 31. The X', Y' and Z' axes of the angular velocity sensor 32 are parallel with the X", Y" and Z" axes of the acceleration sensor 31, respectively.

When the user moves the entire body 41 in a desired direction in the three-dimensional space while aiming the top of the body 41 (i.e., an end positioned in the upper left direction in FIG. 4) at the display unit 54 of the image display 12 located ahead of the input device, the angular velocity sensor 32, which is a biaxial vibrational angular velocity sensor, detects the angular velocities of a pitch angle $\theta$ and yaw angle $\psi$, which measure rotation about a pitch rotation axis and yaw rotation axis parallel with the X' axis and Y' axis, respectively. Instead of the vibrational angular velocity sensor, a geomagnetic angular sensor can be used. The acceleration sensor 31 detects accelerations in the directions of the X" axis and Y" axis. The acceleration sensor 31 can sense the acceleration of gravity as a vector quantity. For the acceleration sensor 31, a triaxial acceleration sensor having three sensing axes, X" axis, Y" axis and Z" axis, can be used.

The user firmly holds the input device 11 in his/her hand and operates and moves the entire input device 11 in any direction in the three-dimensional free space. In other words, the input device 11 is a so-called air remote controller, which is operated and moved in any direction in the air, but not on a desk. The input device 11 detects the direction in which it has been moved and outputs operation signals representing the direction of movement. If any one of the buttons 33 to 35 is pressed, the input device 11 also outputs operation signals corresponding to the pressed button.

[Functional Configuration of Arithmetic Unit]

Figure 5:
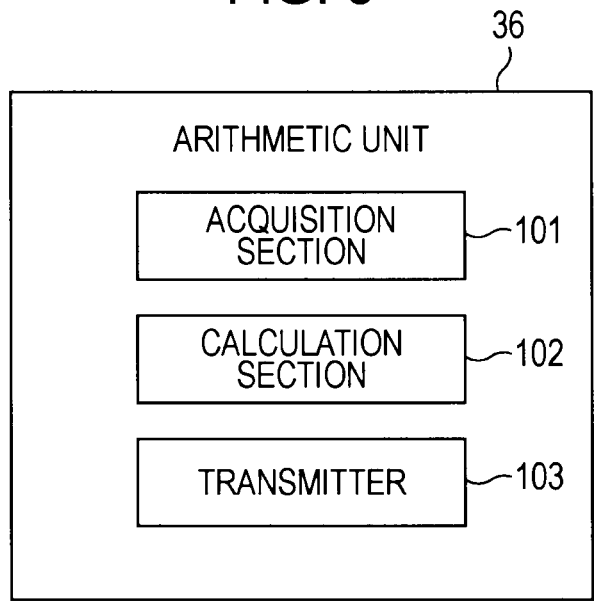
FIG. 5 is a block diagram showing the functional configuration of an arithmetic unit in the input device.

FIG. 5 is a block diagram showing the functional configuration of the arithmetic unit 36 in the input device 11. The arithmetic unit 36 includes an acquisition section 101, a calculation section 102 and a transmitter 103.

The acquisition section 101 acquires angular velocity, acceleration, button information and so on. The calculation section 102 calculates a roll angle, correction angular velocity, pointer movement distance and so on. The transmitter 103 sends the pointer movement distance, commands and other information to the image display 12.

Figure 6:
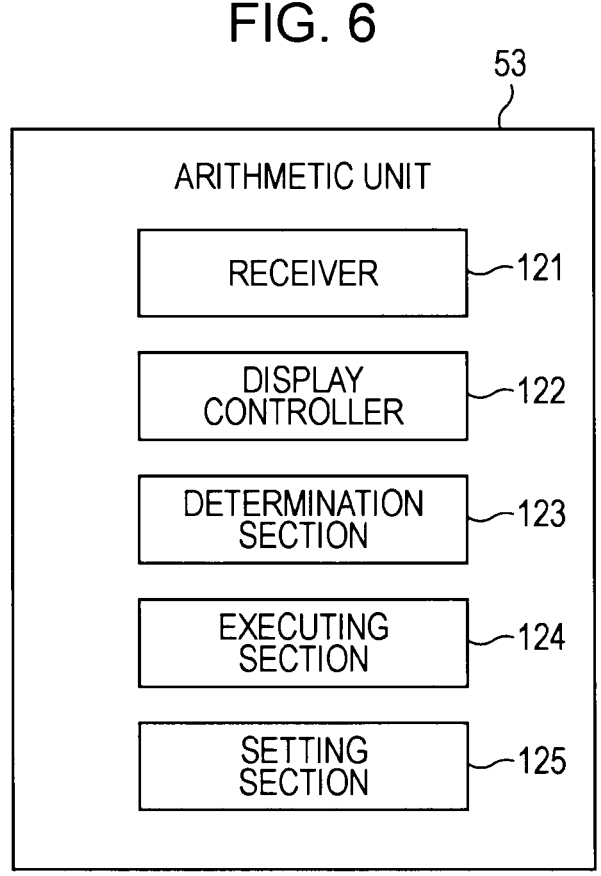
FIG. 6 is a block diagram showing the functional configuration of an arithmetic unit in an image display.

FIG. 6 is a block diagram showing the functional configuration of the arithmetic unit 53 in the image display 12. The arithmetic unit 53 includes a receiver 121, a display controller 122, a determination section 123, an executing section 124 and a setting section 125.

The receiver 121 receives signals transmitted from the input device 11. The display controller 122, serving as a control unit, controllably displays images. The determination section 123 makes various determinations. The executing section 124 carries out commands. The setting section 125 sets the position of the pointer.

[Object Image]

Figure 7:
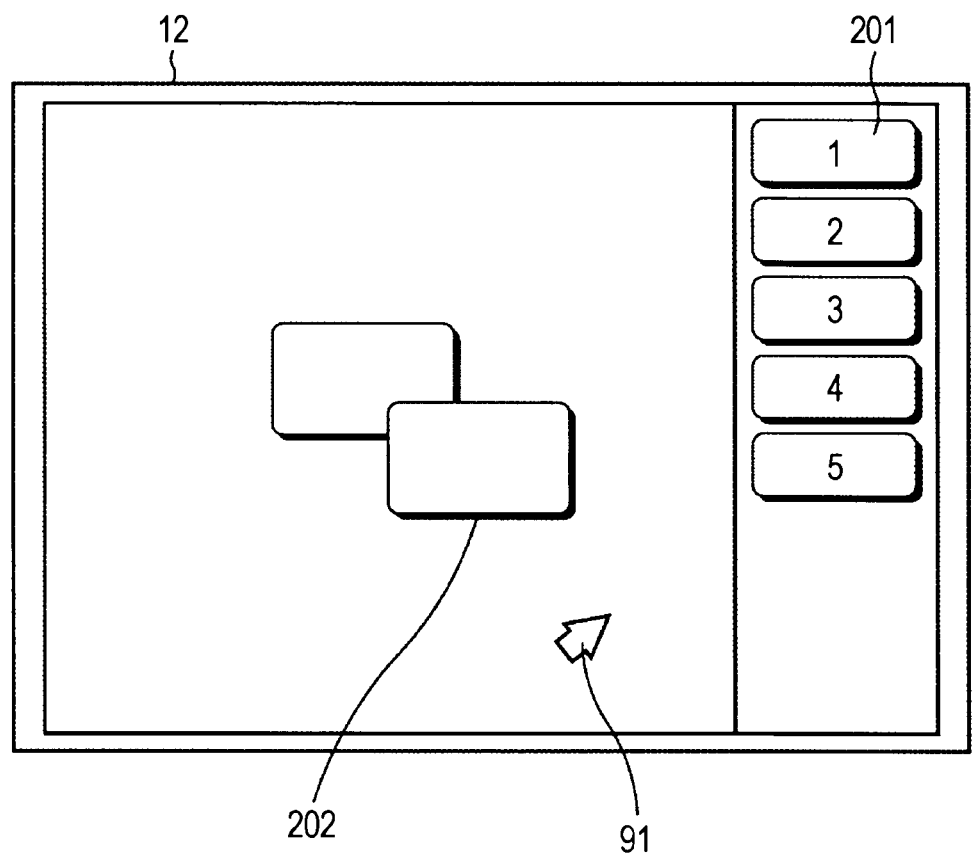
FIG. 7 depicts object images.

FIG. 7 depicts object images. In this embodiment, the pointer 91 and movable objects 202 are regarded as object images which are movably displayed according to the operation of the input device 11. The pointer 91 is placed on a movable object 202 and selection object 201 to move the movable object 202 and select the selection object 201.

[Command Transmission Processing of Input Device]

FIG. 8 is a flow chart describing command transmission processing. Referring to FIG. 8, a description will be made about how the input device 11 performs processing for transmitting commands.

Figure 9A:
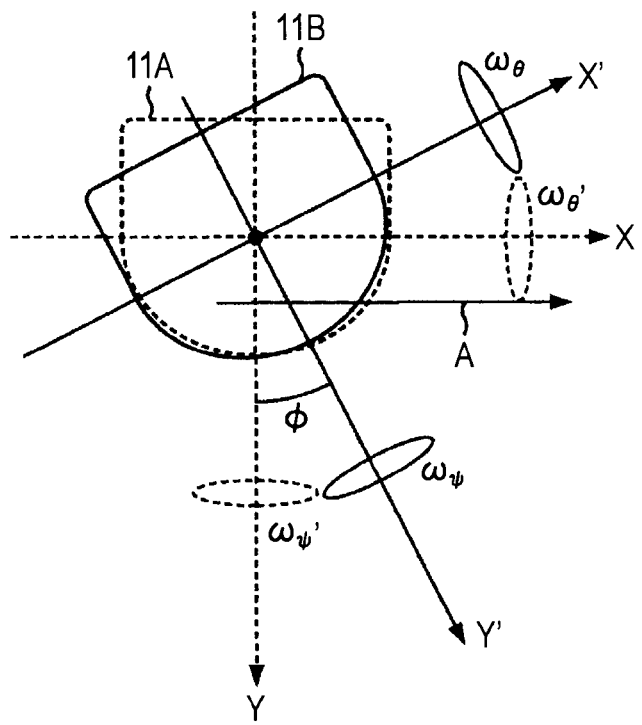
FIGS. 9A and 9B illustrate roll angles.

In step S11 of FIG. 8, the acquisition section 101 acquires angular velocity. Specifically, as shown in FIG. 9A, the angular velocity sensor 32 outputs angular velocity ωψ(t) about the Y' axis and angular velocity ωθ(t) about the X' axis of the movement made by the input device 11 when a user holds and moves it in the three-dimensional free space. The acquisition section 101 acquires the output angular velocities (ωΨ(t), ωθ(t)). More specifically, the angular velocities (ωΨ(t), ωθ(t)) are converted from analog to digital by an A/D converter in the arithmetic unit 36 and then captured by the acquisition section 101.

Figure 9B:
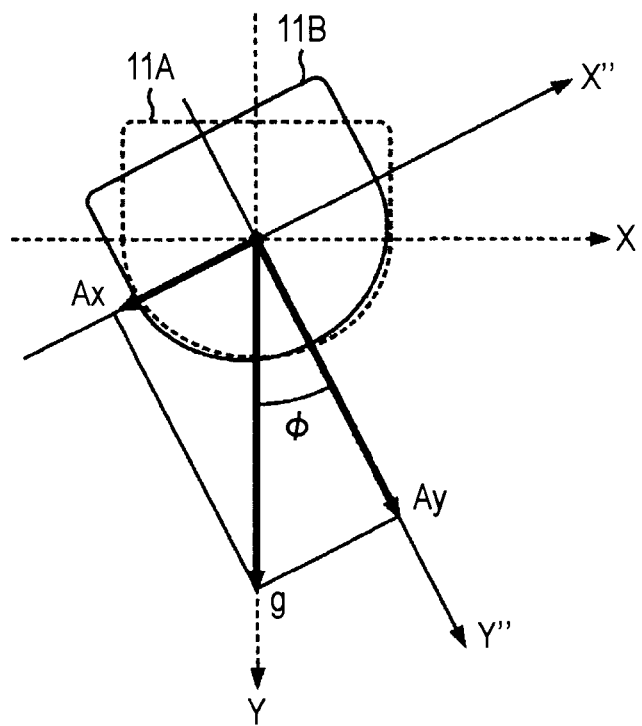

In step S12, the acquisition section 101 acquires acceleration. Specifically, as shown in FIG. 9B, the acceleration sensor 31 outputs accelerations (Ax(t), Ay(t)) in the X" axis direction and Y" axis direction of the movement made by the input device 11 when a user holds and moves it in the three-dimensional free space. The acquisition section 101 acquires the output accelerations (Ax(t), Ay(t)). More specifically, the accelerations (Ax(t), Ay(t)) are converted from analog to digital by an A/D converter in the arithmetic unit 36 and then captured by the acquisition section 101.

In step S13, the calculation section 102 calculates a roll angle. The roll angle φ is obtained by using Equation 1 below from the accelerations (Ax, Ay). The accelerations Ax and Ay are components sensed using the X" axis and Y" axis, respectively, of the acceleration sensor 31.

$$\phi = \arctan(Ax/Ay) \quad (1)$$

As shown in FIG. 9B, when the input device 11 is rotated from the horizontal position indicated by reference numeral 11A about the axis Z" by a roll angle φ as indicated by reference numeral 11B, each component (Ax, Ay) of the acceleration satisfies Equation 2 below. Thus Equation 1 is derived.

$$\tan \phi = Ax/Ay \quad (2)$$

In step S14, the calculation section 102 calculates correction angular velocities. The correction angular velocities (ωψ', ωθ') are obtained by using the following equation.

$$\begin{bmatrix} \omega_{\psi'} \\ \omega_{\theta'} \end{bmatrix} = \begin{bmatrix} \cos\phi & -\sin\phi \\ \sin\phi & \cos\phi \end{bmatrix} \begin{bmatrix} \omega_\psi \\ \omega_\theta \end{bmatrix} \quad (3)$$

As shown in FIG. 9A, the correction angular velocities (ωψ', ωθ') are angular velocities about the Y axis and X axis when the input device is rotated in a clockwise direction by a roll angle φ from the position at which the input device is actually held by a user, indicated by reference numeral 11B, to the horizontal position indicated by reference numeral 11A. The angular velocities (ωψ, ωθ) are actually detected angular velocities about the Y' axis and X' axis when the input device 11, which is in the horizontal position indicated by reference numeral 11A, is rotated in a counterclockwise direction by a roll angle φ.

In step S15, the calculation section 102 calculates a pointer movement distance. The pointer movement distance can be obtained by, for example, multiplying the correction angular velocities (ωψ', ωθ') by the duration of time that is necessary for detection.

Based on the pointer movement distance determined according to the correction angular velocities (ωψ', ωθ'), the distance by which the pointer moves on the image display 12 is controlled so as to correspond to the movement of the input device that has been actually made by the user, thereby reducing the chance that the user feels something unusual.

As shown in FIG. 9A, assuming that the input device 11 that is tilted at a roll angle φ as indicated by reference numeral 11B from the horizontal position indicated by reference numeral 11A is moved in the direction of arrow A (i.e., horizontal direction parallel with the X axis), the direction of arrow A is regarded as a direction tilted in the clockwise direction by the roll angle q with respect to the X' axis of the acceleration sensor 31.

Figure 10:
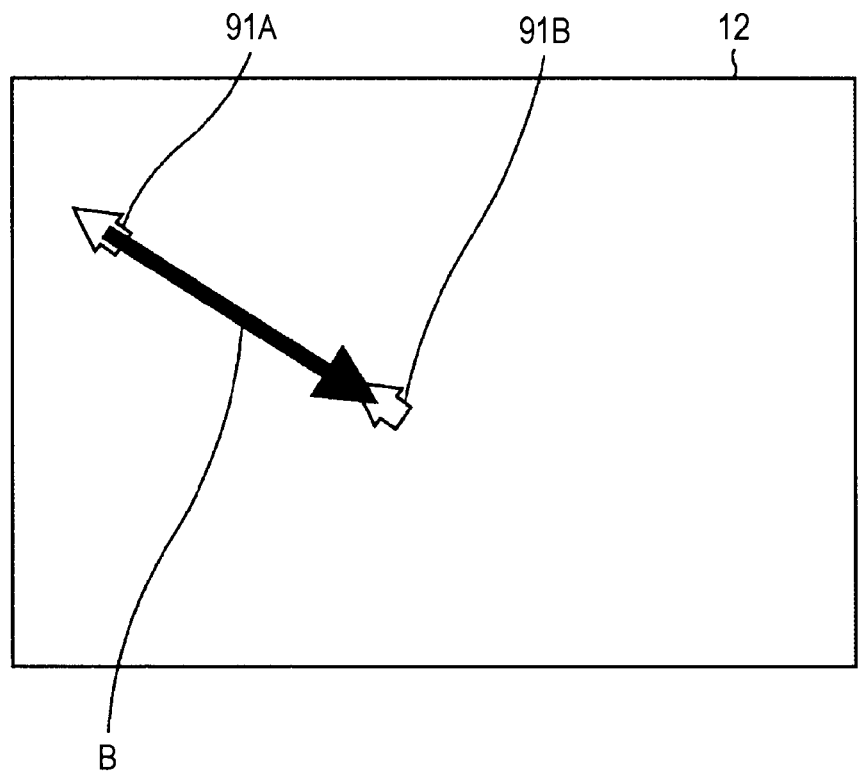
FIG. 10 illustrates the movement of a pointer that is not subjected to correction using the roll angle.

FIG. 10 illustrates the movement of the pointer that is not subjected to correction using the roll angle. If the angular velocity is not corrected, as shown in FIG. 10, the pointer 91A moves in the direction of arrow B (i.e., downward to the right and tilted at the roll angle φ with respect to the horizontal direction) and appears as a pointer 91B. The user feels something unusual because in spite of the fact that the user has moved the input device in the horizontal direction, the pointer 91 moves downward to the right.

Figure 11:
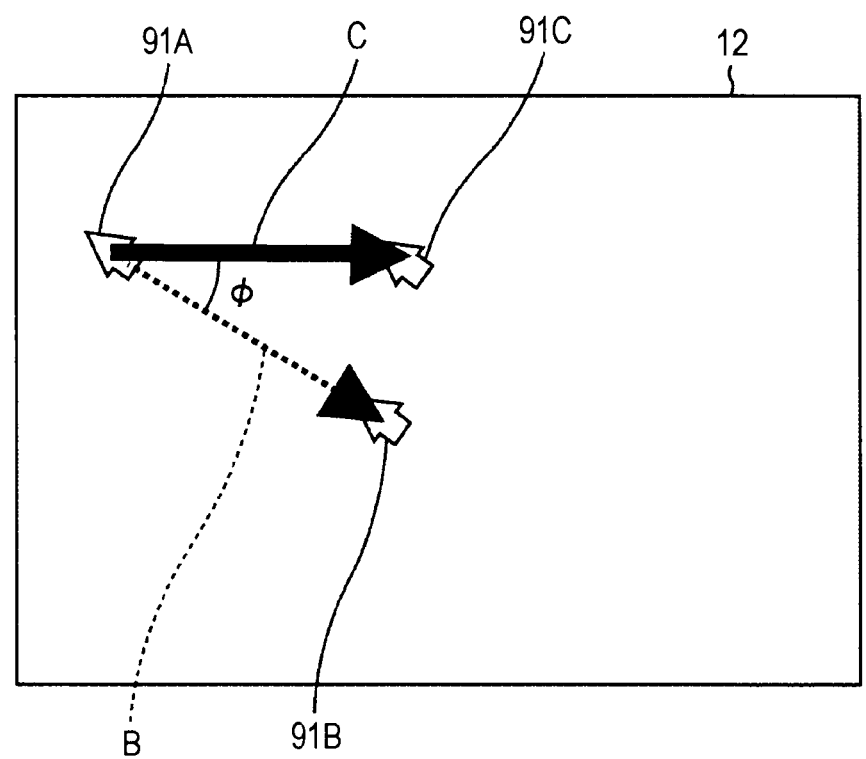
FIG. 11 illustrates the movement of the pointer that is subjected to correction using the roll angle.

FIG. 11 illustrates the movement of the pointer that is subjected to correction using the roll angle. If the angular velocity is corrected by the roll angle φ, as shown in FIG. 11, the pointer 91A moves in the direction of arrow C (in the horizontal direction) and appears as a pointer 91C. The direction of arrow C is parallel to the direction of arrow A. The user does not feel something unusual because the pointer 91 moves in the same direction as the input device has been moved by the user.

Turning now to FIG. 8, in step S16, the acquisition section 101 acquires button information issued by operating each button. This step may be also performed before step S11.

Next, in step S17, the transmitter 103 transmits the pointer movement distance and commands associated with the buttons. The command associated with each button is generated based on the button information corresponding to the operated button, and is acquired in step S16.

When any one of the directional buttons is operated while the body 41 is being moved in the free space, information corresponding to the movement of the body 41 in the free space, pointer movement distance as information corresponding to the operated directional button and a command are output from the transmitter 103 of the arithmetic unit 36, amplified by the communication unit 37, and transmitted by radio waves via the antenna 38 to the image display 12. The information and command are transmitted in order to linearly move the object image by only an amount corresponding to a directional component of the operated directional button out of an operation amount in the free space. The pointer movement distance and command are received by the image display 12 (this will be described later in step S51 in FIG. 12).

The operation of the directional buttons may be achieved by the user continuously pressing the directional buttons or by locking the pressed directional buttons into an operating state.

After step S17, the processing returns to step S11, and the processes of steps S11 to S17 are repeated.

[Display Control Processing 1 of Image Display]

As described above, upon the input device 11 transmitting signals, the image display 12 executes processing according to the signals. As an example of the processing executed by the image display 12, processing for controlling the position of the pointer 91 with the directional buttons 33 will be described.

Figure 12:
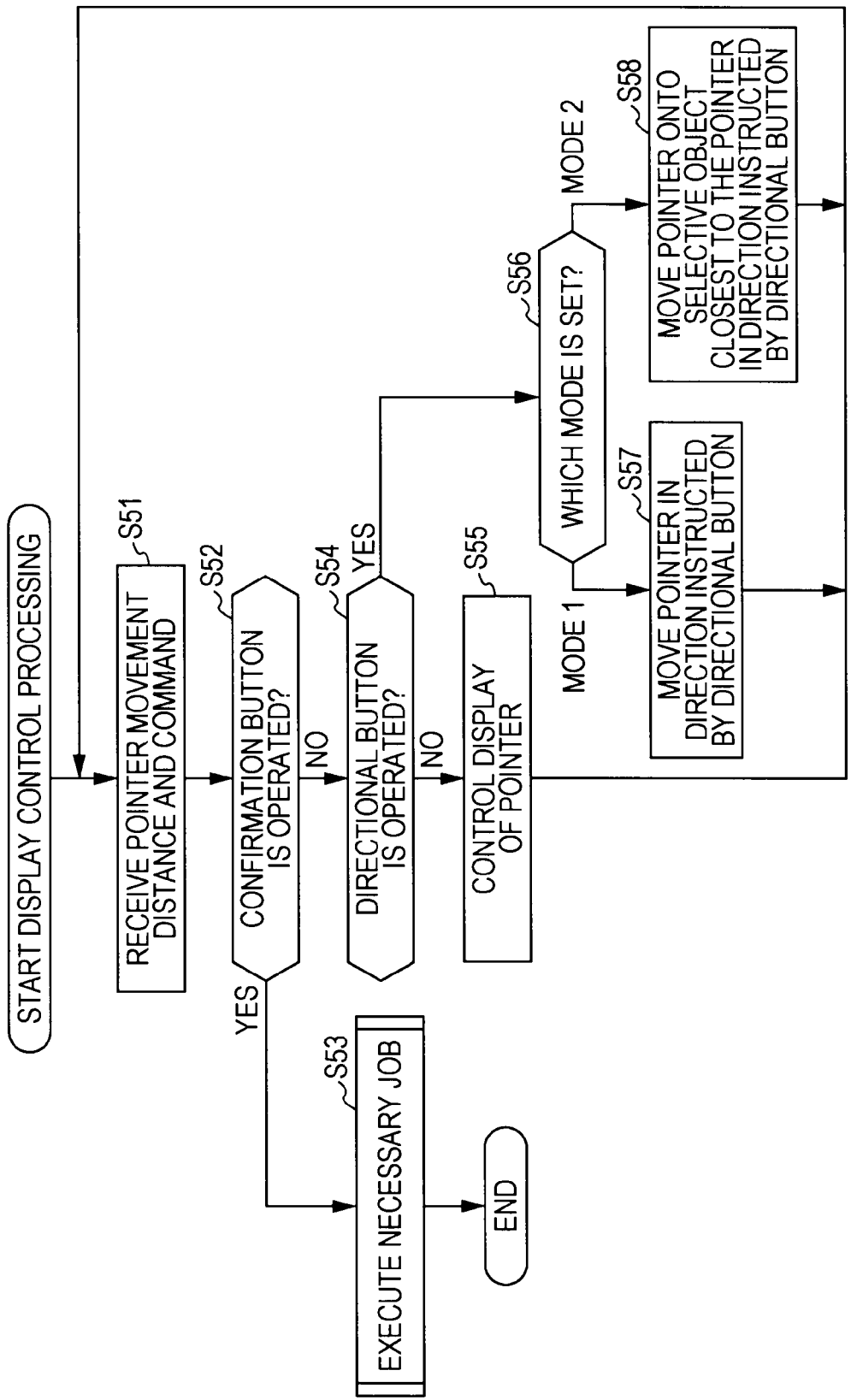
FIG. 12 is a flow chart that describes display control processing.

FIG. 12 is a flow chart that describes display control processing. This processing is performed by the image display 12 according to signals that are transmitted from the input device 11.

In step S51, the receiver 121 receives a pointer movement distance and a command. The pointer movement distance and command are those transmitted from the input device 11 in step S17 in FIG. 8.

In step S52, the determination section 123 determines whether the confirmation button has been pressed. If it is determined that the confirmation button 34 has been pressed, the executing section 124 executes a job necessary for the received command in step S53. Then, the processing is terminated.

In step S52, if it is determined that the confirmation button 34 has not been pressed, the determination section 123 determines whether any one of the directional buttons has been pressed in step S54. If it is determined that none of the directional buttons 33 have been pressed, the display controller 122 controls the display of the pointer in step S55. Specifically, the display controller 122 calculates the position of the pointer 91 based on the pointer movement distance received from the input device 11. For example, the pointer position represented by (X(t), Y(t)) is obtained from the pointer movement distances (ΔX, ΔY) by using the following equation.

$$(X(t), Y(t)) = (X(t) + \Delta X, Y(t) + \Delta Y) \quad (4)$$

Then, the display controller 122 displays the pointer 91 at the position obtained by the calculation, and therefore the pointer 91 appears at the position corresponding to the movement of the input device 11 operated by the user in the three-dimensional space. Subsequently, the processing returns to step S51.

If it is determined that one of the directional buttons 33 has been pressed in step S54, the determination section 123 determines which of the modes is set in step S56. The mode is set to Mode 1 or Mode 2 in advance according to the user's instruction. Alternatively, the mode can be selected by the user as the occasion arises.

If Mode 1 is set, in step S57, the display controller 122 moves the pointer in the direction instructed by the directional button. Specifically, if any one of the directional buttons 33 is pressed while the input device 11 is being moved in the free space, the display controller 122 determines that only a directional component corresponding to the directional button 33 is effective out of directions in which the input device 11 is moved in the free space. More specifically, if any one of the directional buttons 33 is operated while the body 41 is being operated in the free space, the display controller 122 controls the object image so that the object image linearly moves by only an amount corresponding to the directional component instructed by the directional button 33 out of an operation amount of the body 41 operated in the free space after the operation of the directional button 33. In other words, the controller 122 regulates the movement of the pointer 91 so as to limit movement of the pointer 91 in all directions except for the direction instructed by the directional button 33 and to permit the pointer 91 to move in only the direction instructed by the directional button 33.

Figure 13:
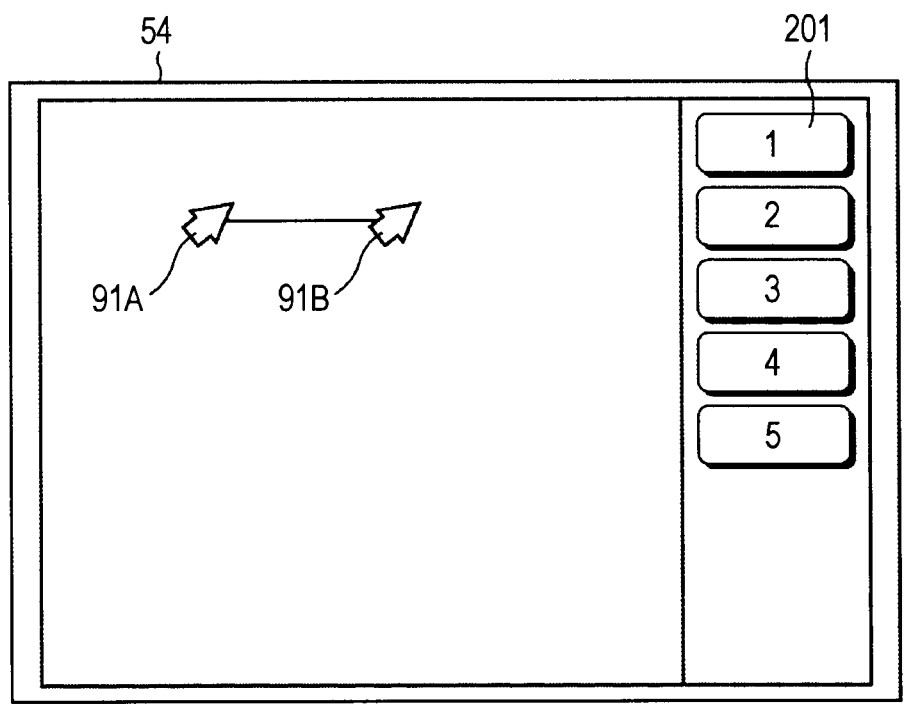
FIG. 13 illustrates the movement of the pointer in Mode 1.
Figure 14:
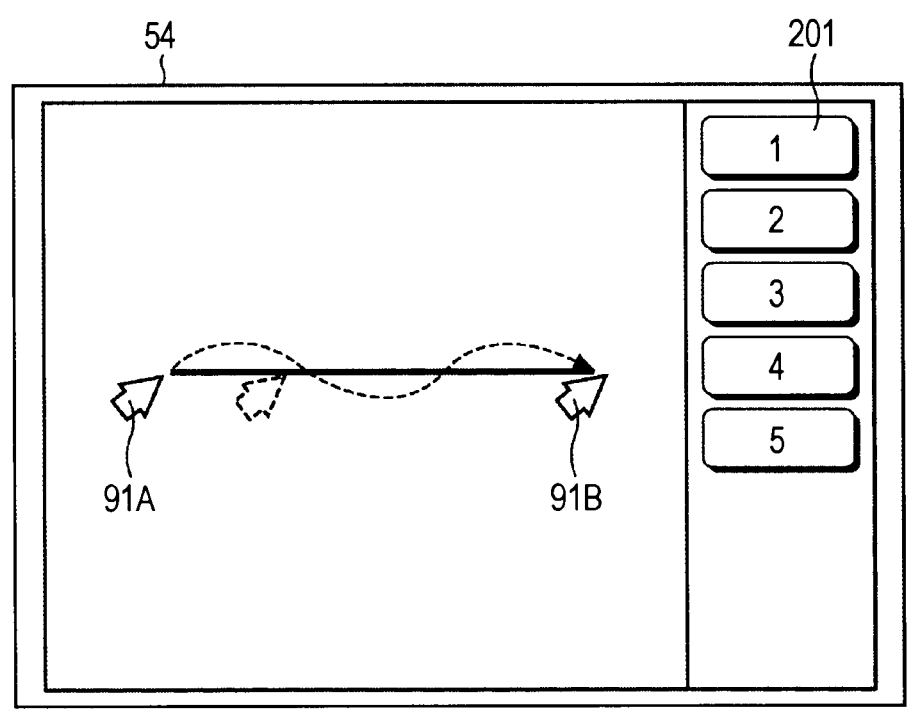
FIG. 14 illustrates the movement of the pointer in Mode 1.

FIGS. 13 and 14 illustrate the movement of the pointer in Mode 1.

As shown in FIG. 13, assuming that, while the pointer 91A is on the display, the input device 11 is moved rightward in the free space with the right button 33R pressed. The input device 11 in real life generates various directional motion components, in addition to the horizontal motion component, due to a user's unstable hand movement; however, in this case shown by FIG. 13, out of the various directional motion components, only the direction corresponding to the right button 33R, which is the horizontal direction component, is determined to be effective. As a result, the pointer 91A linearly moves in the horizontal (x axis) direction by an amount corresponding to the operation amount in which the input device 11 has been horizontally moved, and appears as a pointer 91B. In other words, the pointer 91 is regulated so as to limit movement in the y axis direction and to permit only movement in the x axis direction. The pointer 91 linearly moves to the desired position by adjusting the operation time.

FIG. 14 illustrates an example of how the pointer is displayed when a straight line is drawn. Due to a user's unstable hand movement, it may be difficult to accurately move the input device 11 straight in the free space. When the user just moves the input device 11 rightward in the free space, hand movement makes the line drawn by the pointer 91A, that is, the track of the pointer 91A, wavy as shown by the dashed line, and the track of the pointer 91A is not precisely straight.

In this embodiment, the user who tries to draw a horizontal straight line with the pointer 91A moves the input device 11 rightward in the free space while pushing the right button 33R. Although hand movement occurs at this time, out of the directional motion components, only the direction corresponding to the right button 33R, that is the horizontal motion component, is determined to be effective. As a result, the pointer 91A linearly moves in the horizontal (x axis) direction by only an amount corresponding to an operation amount by which the input device 11 has been horizontally moved, and appears as a pointer 91B. As with this case, the pointer is regulated so as to limit movement in the y axis direction and to permit only movement in the x axis direction. Therefore, the user can readily draw a horizontal straight line without being affected by the user's hand movement.

If, for example, the up button 33U and right button 33R are simultaneously operated, the pointer 91 is linearly moved upward to the right at 45 degrees.

In the above description, the pointer 91 is moved only a distance corresponding to an operation amount in which the input device 11 has been operated in the free space; however, the pointer 91 can be moved only a distance corresponding to an operation time in which the directional button 33 has been operated.

If it is determined that Mode 2 is set in step S56, the display controller 122 moves the pointer on a selection object that is closest to the pointer and in the direction instructed by the directional button in step S58. In Mode 2, the movement of the body 41 in the three-dimensional space is ignored. In other words, the acceleration and angular velocity detected by the acceleration sensor 31 and angular velocity sensor 32 are ignored.

Figure 15:
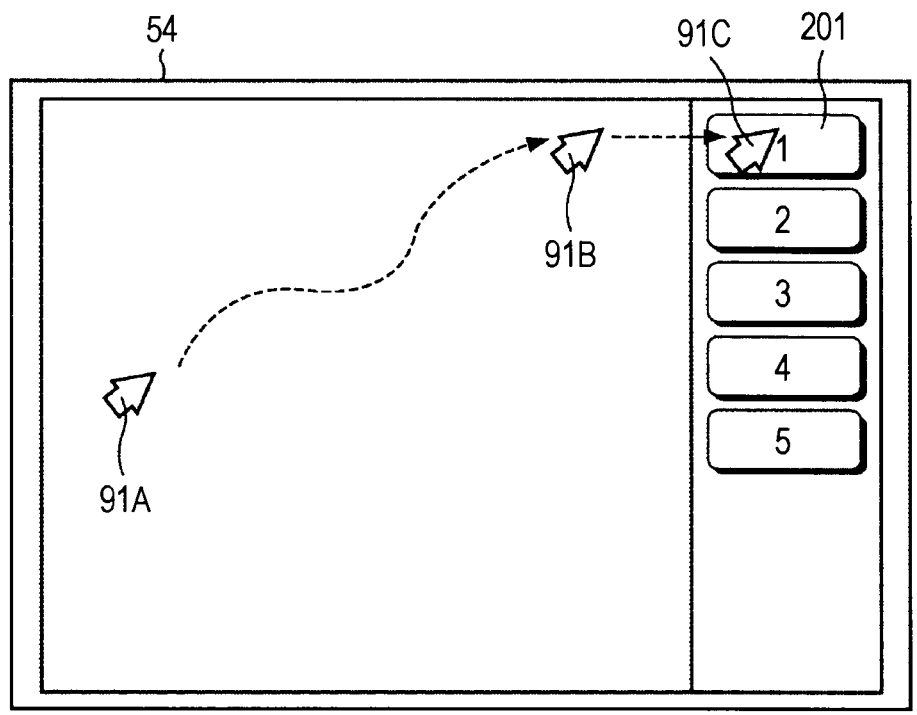
FIG. 15 illustrates the movement of the pointer in Mode 2.
Figure 16:
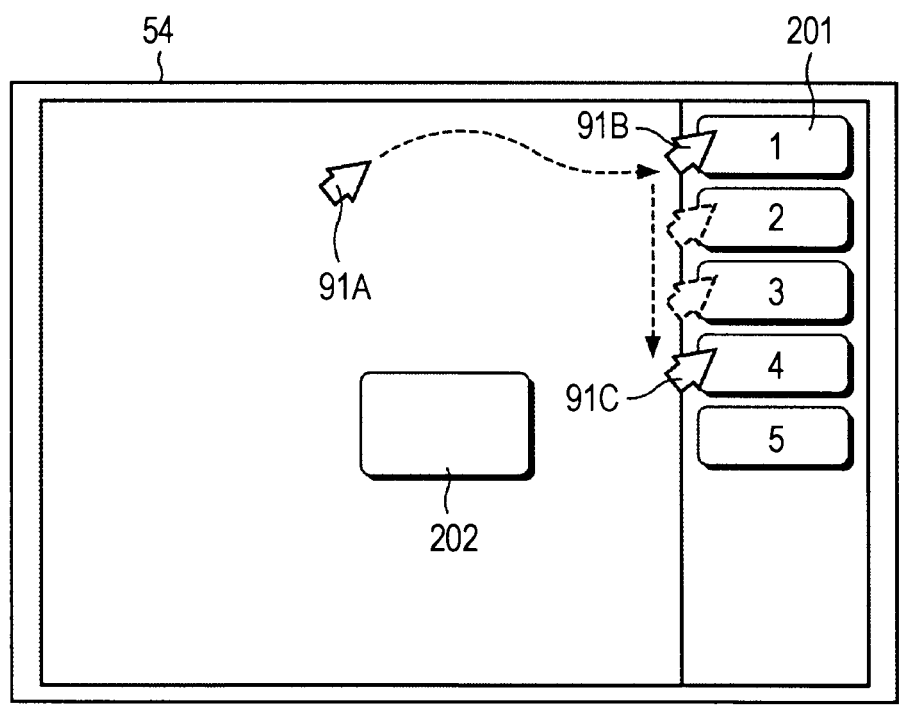
FIG. 16 illustrates the movement of the pointer in Mode 2.
Figure 17:
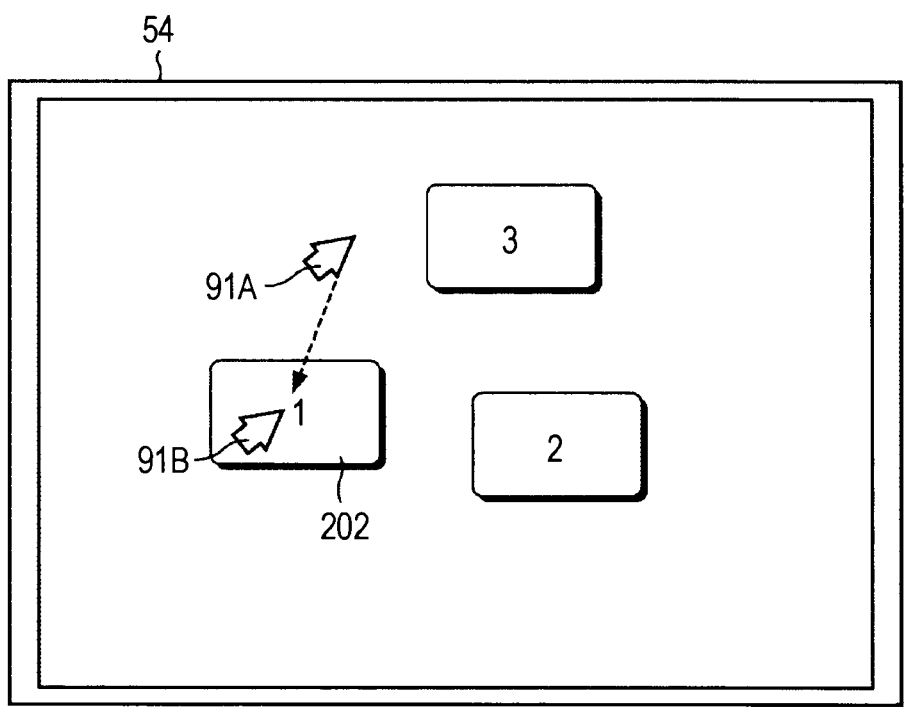
FIG. 17 illustrates the movement of the pointer in Mode 2.

FIGS. 15 to 17 illustrate the movement of the pointer in Mode 2.

In the example shown in FIG. 15, as a result of the movement of the input device 11 upward to the right, the pointer 91A nonlinearly moves with jitters caused by the user's hand movement upward to the right to the position of the pointer 91B through the process in step S55. At this time, the pointer 91B is not on the object. If the right button 33R is further operated with the pointer 91B remaining in that position, the pointer 91B moves to a selection object 201 that is positioned in the horizontal direction (i.e., x axis direction) corresponding to the direction of the right button 33R and is positioned away from the pointer 91B, but closest to the pointer 91B. In short, the pointer 91B moves to the selection object 201 of number 1, and appears as a pointer 91C. Subsequent operation of the confirmation button 34 selects the selection object 201 of number 1. As with the other case, the pointer is regulated so as to limit movement in the y axis direction and to permit only movement in the x axis direction.

Even though the pointer 91 does not hover over the object, it is thus possible to linearly move the pointer 91 quickly and accurately to the desired position by operating the directional button 33.

In FIG. 16, the pointer 91A nonlinearly moves with jitters caused by the user's hand movement to the position of the pointer 91B that is on the selection object 201 of number 1 by operating the input device 11 in the free space. Then, the down button 33D is operated while the pointer 91B remains on the selection object 201 of number 1. Consequently, the pointer 91B moves from the selection object 201 of number 1 onto a selection object 201 of number 2 that is positioned in the lower direction, which meets the instruction by the down button 33D, and is positioned away from the pointer 91B, but closest to the pointer 91B and next to the selection object 201 of number 1. This occurs because the pointer is regulated so as to limit movement in the x axis direction and to permit only movement in the y axis direction. From then on, whenever the down button 33D is operated, the pointer 91B moves to the downstream objects, such as a selection object 201 of number 3 and then a selection object 201 of number 4.

Even though the pointer 91 hovers over an object, it is thus possible to linearly move the pointer 91 quickly and accurately to the desired position by operating the directional button 33.

FIG. 17 shows three movable objects 202 and the pointer 91A positioned above, but not on a movable object 202 of number 1. If the down button 33D is pressed with the pointer 91A positioned as described above, the pointer 91A moves to the movable object 202 of number 1 that is positioned in the lower direction, which meets the instruction by the down button 33D, and is positioned away from the pointer 91A, but closest to the pointer 91A, and appears as a pointer 91B. This occurs because the pointer is regulated so as to limit movement in the x axis direction and to permit only movement in the y axis direction. In this embodiment, the pointer 91 that is on an object is controlled to appear at the center of the object. Pressing the drag button 35 while the pointer is positioned on the movable object 202 and moving the input device 11 in a predetermined direction allows the user to drag the movable object 202 to a desired position.

Even though the pointer 91 does not hover over the object, it is thus possible to linearly move the pointer 91 quickly and accurately to the desired position by operating the directional button 33.

After the processes in steps S57 and S58 in FIG. 12 are executed, the processing returns to step S51 and the processes in steps S51 to S57 or S58 are repeated.

[Display Control Processing 2 of Image Display]

Figure 18:
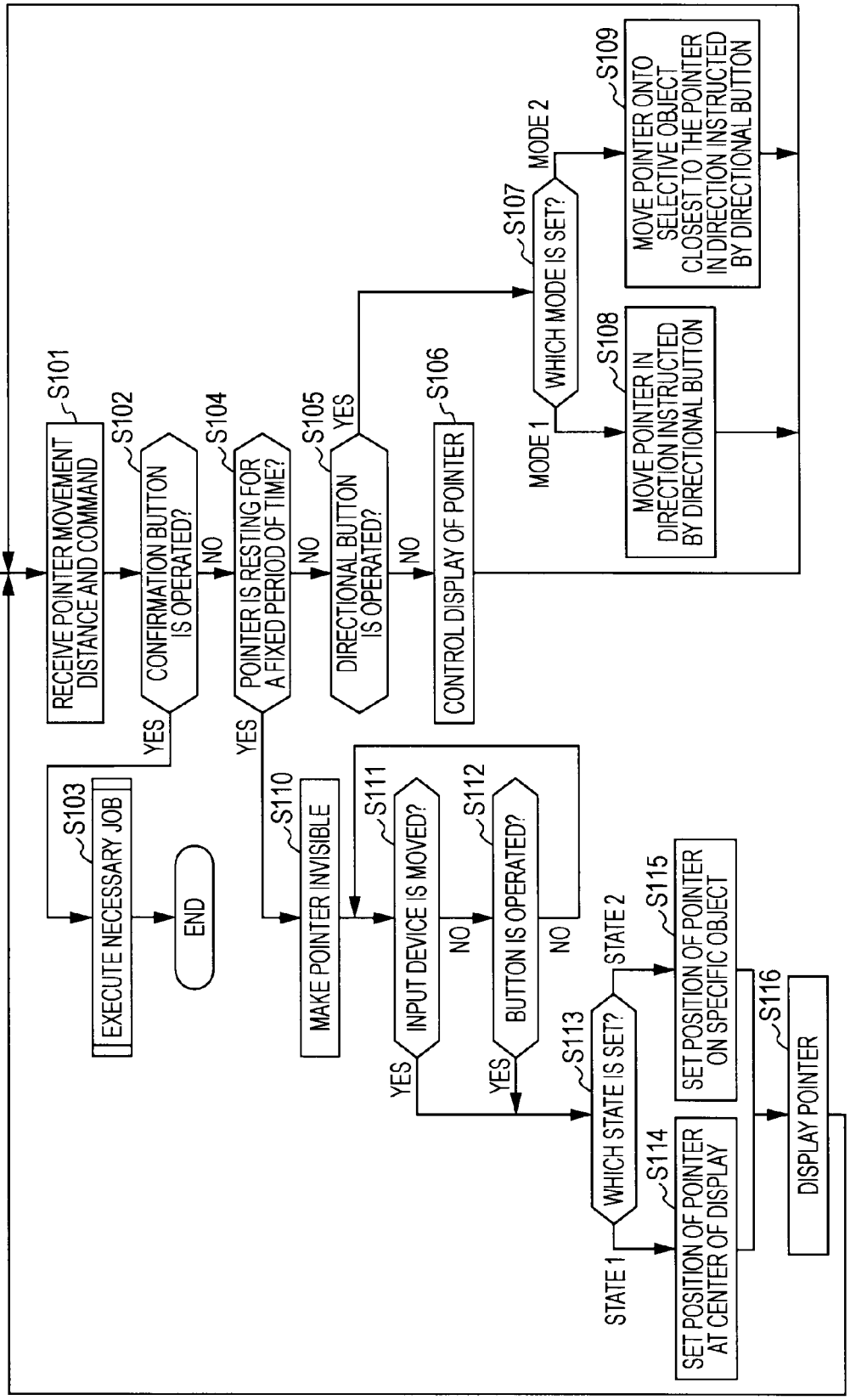
FIG. 18 is a flow chart that describes another display control processing.

FIG. 18 is a flow chart that describes another display control processing. This processing is also performed by the image display 12 according to signals that are transmitted from the input device 11.

The steps S101 to S103 and steps S105 to S109 in FIG. 18 are the same as the steps S51 to S58 in FIG. 12. In the embodiment shown in FIG. 19, a determination process of step S104 is added between the step S102 and step S105 which correspond to the step S52 and step S54 in FIG. 12.

In step S104, a determination section 123 determines whether the pointer has been resting for a fixed period of time. If it is determined that the pointer 91 has not rested for a fixed period of time or is moving, the processing goes to step S105 and the same processes in FIG. 12 are executed, and the description thereof is not reiterated.

If it is determined that the pointer 91 has been resting for a fixed period of time in step S104, the display controller 122 makes the pointer invisible in step S110.

Figure 19:
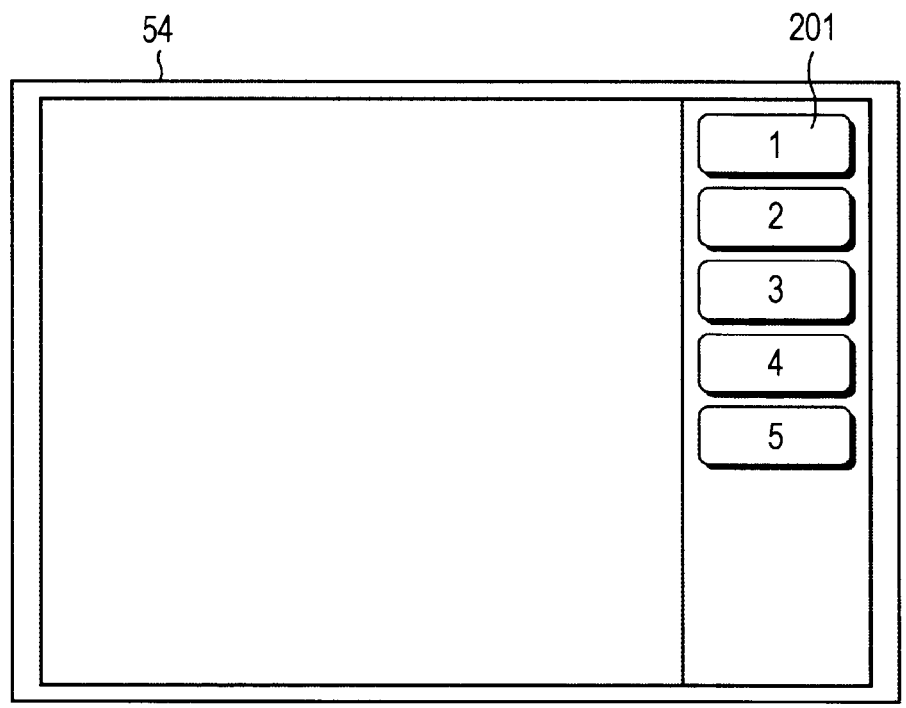
FIG. 19 illustrates a display with an invisible pointer.

FIG. 19 shows the display without the pointer. As shown in FIG. 19, the pointer 91, which has been on the display, becomes no longer visible. This occurs, for example, when a certain time has elapsed since the user left the input device 11 on a table. This function prevents the pointer 91 from unnecessarily appearing on the display while the user is not using the input device and from obstructing images necessary to be shown.

In step S111, the determination section 123 determines whether the input device 11 has been moved. For example, when the absolute values of detected angular velocity and acceleration exceed a preset reference value, the determination section 123 determines that the input device 11 has been moved.

If it is determined that the input device 11 has not been moved, the determination section 123 determines whether any buttons on the input device 11 are pressed in step S112. If it is determined that none of the buttons have been pressed, the processing returns to step S111 and the steps 111 and 112 are repeated. In other words, until the input device 11 is actually used by the user, the processes in steps S111 and S112 are repeated.

The repetition of the steps S111 and S112 can be set to terminate when the repetition time reaches a predetermined time. This can reduce draining of batteries 73.

If it is determined that the input device 11 has been moved in step S111 and a button is pressed in step S112, the determination section 123 determines that the input device 11 is actually being used by the user. Then, in step S113, the determination section 123 determines which of the states is set. The state is set to State 1 or State 2 in advance according to the user's instruction.

If State 1 is set, in step S114, the setting section 125 sets the position of the pointer at the center of the display. Then, the display controller 122 displays the pointer at the set position in step S116.

As described above, if the input device 11 is moved or the button is pressed while the pointer 91 is invisible as shown in FIG. 19, the pointer 91 shows up at an initial display position.

Figure 20:
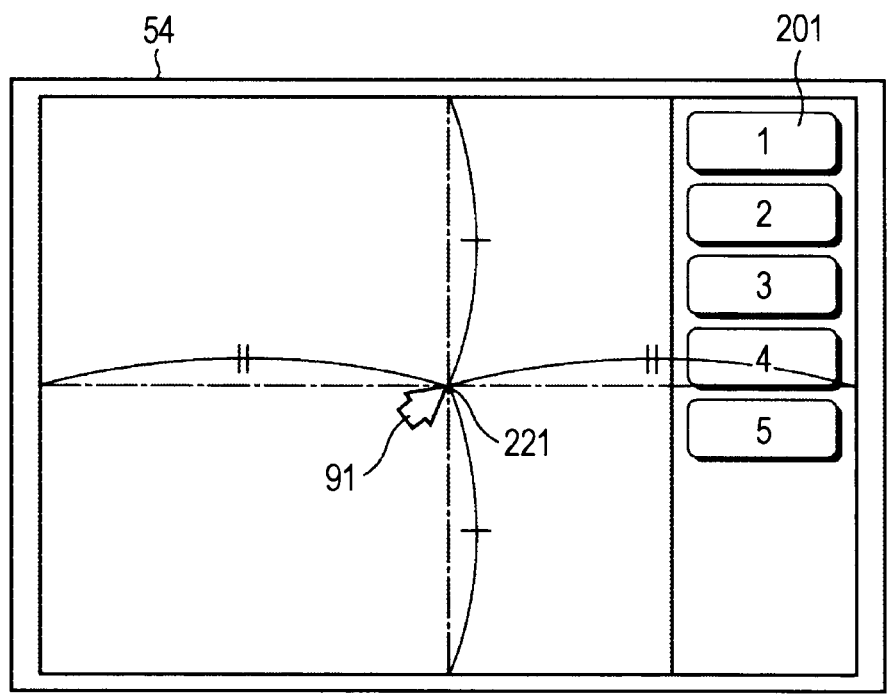
FIG. 20 illustrates an initial display position of the pointer in State 1.

FIG. 20 illustrates the initial display position of the pointer in State 1. As shown in FIG. 20, the pointer 91 in State 1 appears at a rough center of the display unit 54. In the example in FIG. 20, the pointer 91 has its pointing end at a center point 221 of the display unit 54.

On the other hand, if it is determined that State 2 is set in step S113, the setting section 125 sets the position of the pointer on a specific object in step S115. Then, in step S116, the display controller 122 displays the pointer at the set position.

Figure 21:
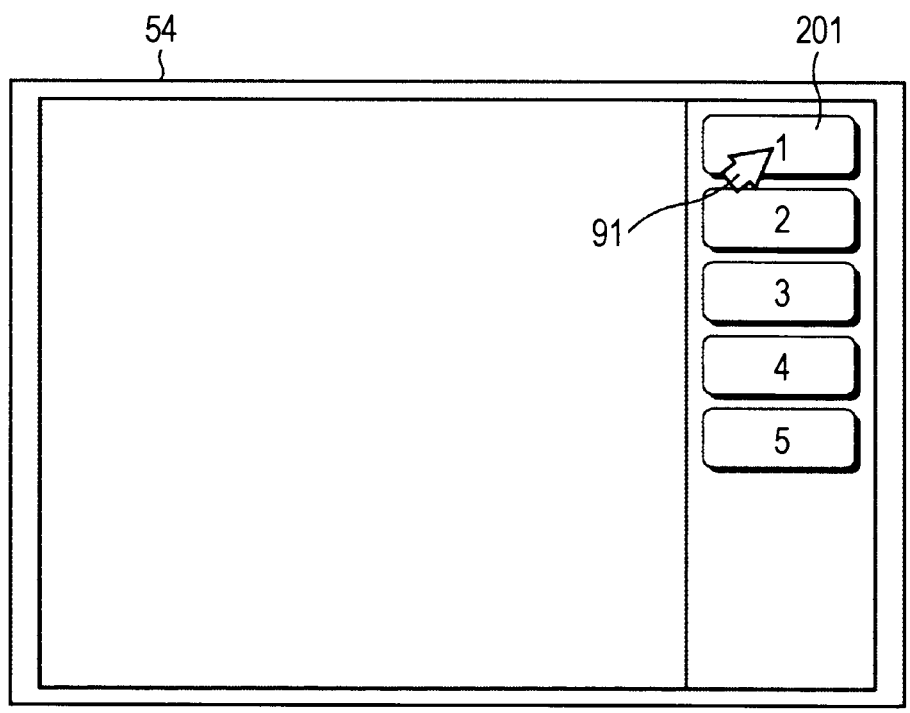
FIG. 21 illustrates an initial display position of the pointer in State 2.

FIG. 21 illustrates the initial display position of the pointer in State 2. As shown in FIG. 21, the pointer 91 in State 2 appears on a selection object 201 as the specific object.

As described above, the initial display position of the pointer 91 is generally fixed to a specific position typically specified by the user, thereby allowing the user to quickly find where the pointer 91 is and making subsequent actions easier.

2. Modifications

In the above descriptions, the image display 12, which is remotely controlled by the input device 11, is a television receiver; however, the image display 12 may be a personal computer and other types of information processing devices.

In addition, the information processing device to be controlled may be a portable information processing device such as a cellular phone and a PDA (Personal Digital Assistant).

The above-mentioned sequences of processes may be executed by hardware, but they may also be executed by software. The execution by software is supported by a computer having a dedicated hardware storage device in which a program constituting this software is stored or a computer capable of executing various functions of various installed programs or, for example, a general-purpose personal computer in which the program is installed from a program storage medium.

The steps describing the program in this specification include not only processes which are executed in the described sequence in a time-dependent manner but also processes which are executed in parallel or discretely.

It should be noted that term "system" herein denotes an entire apparatus constituted by a plurality of devices.

The present application contains subject matter related to that disclosed in Japanese Priority Patent Application JP 2009-008745 filed in the Japan Patent Office on Jan. 19, 2009, the entire content of which is hereby incorporated by reference.

It should be understood that the present invention is not limited to the aforementioned embodiment and various modifications and alterations may occur as they are within the scope of the summary of the invention.

What is claimed is:

1. An input device, comprising:
   a body that is held by a user and operated in a three-dimensional free space so that the input device remotely operates an object image displayed by an information processing device;
   a directional button that is provided on the body and is operated by the user to point in a direction;
   circuitry including an acceleration sensor and an angular velocity sensor configured to
      determine a roll angle of the body in the three-dimensional free space based on an output of the acceleration sensor;
      determine a correction angular velocity of the body based on an angular velocity of the body detected by the angular velocity sensor and the roll angle;
      calculate operation information of the body in the three-dimensional free space according to movement information of movement of the body and the correction angular velocity;
      receive, during the movement of the body in the three-dimensional free space, a directional button input according to operation of the directional button by the user;
      set directional button operation information according to the directional button input; and
      calculate a pointer movement distance according to the operation information and the directional button operation information; and
   a transmitter that is provided in the body, the transmitter transmits the pointer movement distance and the directional button operation information, wherein
   a mode is set by the user,
   when the mode set by the user is a first mode, the object image moves in a direction corresponding to the directional button operation information by only the pointer movement distance, which is an amount corresponding to a linear movement distance of the body in the three-dimensional free space, as indicated in the operation information, the linear movement distance only corresponding to an operation time period in which the directional button is operated, and the object image does not move in any direction other than the direction corresponding to the directional button operation information,
   when the user simultaneously operates at least two of the directional button and other directional buttons different from the directional button in the first mode, the circuitry is configured to calculate an averaged direction that is an average of the at least two of the directional button and other directional buttons and is configured to calculate the pointer movement distance according to the operation information and the averaged direction so that the object image linearly moves in the averaged direction by only the pointer movement distance and the object image does not move in any direction other than the averaged direction,
   when the mode set by the user is a second mode, the second mode being different than the first mode, the object image moves onto a selection image that is closest to the object image in the direction corresponding to the directional button operation information, and
   when the user simultaneously operates the at least two of the directional button and other directional buttons in the second mode, the circuitry is configured to calculate the averaged direction and to calculate the pointer movement distance according to the operation information and the averaged direction so that the object image moves onto the selection image that is closest to the object image in the direction corresponding to the averaged direction.

2. The input device according to claim 1, wherein the object image is a pointer.

3. The input device according to claim 1, wherein at least four directional buttons are provided on the body, each directional button associated with a different direction and operated by the user to point in the different direction.

4. An input method performed by an input device that includes a body, circuitry including an acceleration sensor and an angular velocity sensor and a transmitter, the body being held by a user and operated in a three-dimensional free space, the input method comprising:
   determining, by the circuitry, a roll angle of the body in the three-dimensional free space based on an output of the acceleration sensor;

determining, by the circuitry, a correction angular velocity of the body based on an angular velocity of the body detected by the angular velocity sensor and the roll angle;

calculating, by the circuitry, operation information of the body in the three-dimensional free space according to movement information of movement of the body and the correction angular velocity;

receiving, by the circuitry during the movement of the body in the three-dimensional free space, a directional button input according to operation of a directional button by the user, the directional button provided on the body;

setting, by the circuitry, directional button operation information according to the directional button input;

calculating, by the circuitry, a pointer movement distance according to the operation information and the directional button operation information;

transmitting, by the transmitter, the pointer movement distance and the directional button operational information; and remotely operating, by the input device, an object image displayed by an information processing device, wherein a mode is selected by the user, when the mode set by the user is a first mode, the object image moves in a direction corresponding to the directional button operation information by only the pointer movement distance, which is an amount corresponding to a linear movement distance of the body in the three-dimensional free space, as indicated in the operation information, the linear movement distance only corresponding to an operation time period in which the directional button is operated, and the object image does not move in any direction other than the direction corresponding to the directional button operation information, when the user simultaneously operates at least two of the directional button and other directional buttons different from the directional button in the first mode, the circuitry is configured to calculate an averaged direction that is an average of the at least two of the directional button and other directional buttons and is configured to calculate the pointer movement distance according to the operation information and the averaged direction so that the object image linearly moves in the averaged direction by only the pointer movement distance and the object image does not move in any direction other than the averaged direction, when the mode set by the user is a second mode, the second mode being different than the first mode, the object image moves onto a selection image that is closest to the object image in the direction corresponding to the directional button operation information, and when the user simultaneously operates the at least two of the directional button and other directional buttons in the second mode, the circuitry is configured to calculate the averaged direction and to calculate the pointer movement distance according to the operation information and the averaged direction so that the object image moves onto the selection image that is closest to the object image in the direction corresponding to the averaged direction.

5. The input method according to claim 4, wherein the object image is a pointer.

6. The input device according to claim 4, wherein at least four directional buttons are provided on the body, each directional button associated with a different direction and operated by the user to point in the different direction.

7. A non-transitory computer readable medium that stores computer readable instructions that, when executed by a processor of an input device, the input device further including a body, a transmitter, an acceleration sensor and an angular velocity sensor, the body being held by a user and operated in a three-dimensional free space, cause the processor to:

determine a roll angle of the body in the three-dimensional free space based on an output of the acceleration sensor;

determine a correction angular velocity of the body based on an angular velocity of the body detected by the angular velocity sensor and the roll angle;

calculate operation information of the body in the three-dimensional free space according to movement information of movement of the body and the correction angular velocity;

receive, during the movement of the body in the three-dimensional free space, a directional button input according to operation of a directional button by the user, the directional button provided on the body;

set directional button operation information according to the directional button input;

calculate a pointer movement distance according to the operation information and the directional button operation information;

transmit the pointer movement distance and the directional button operational information; and remotely operate an object image displayed by an information processing device, wherein a mode is selected by the user, when the mode set by the user is a first mode, the object image moves in a direction corresponding to the directional button operation information by only the pointer movement distance, which is an amount corresponding to a linear movement distance of the body in the three-dimensional free space, as indicated in the operation information, the linear movement distance only corresponding to an operation time period in which the directional button is operated, and the object image does not move in any direction other than the direction corresponding to the directional button operation information, when the user simultaneously operates at least two of the directional button and other directional buttons different from the directional button in the first mode, the processor is configured to calculate an averaged direction that is an average of the at least two of the directional button and other directional buttons and is configured to calculate the pointer movement distance according to the operation information and the averaged direction so that the object image linearly moves in the averaged direction by only the pointer movement distance and the object image does not move in any direction other than the averaged direction, when the mode set by the user is a second mode, the second mode being different than the first mode, the object image moves onto a selection image that is closest to the object image in the direction corresponding to the directional button operation information, and when the user simultaneously operates the at least two of the directional button and other directional buttons in the second mode, the processor is configured to calculate the averaged direction and to calculate the pointer movement distance according to the operation information and the averaged direction so that the object image moves onto the selection image that is closest to the object image in the direction corresponding to the averaged direction.

8. The non-transitory computer readable medium according to claim 7, wherein the object image is a pointer.

9. The input device according to claim 7, wherein at least four directional buttons are provided on the body, each directional button associated with a different direction and operated by the user to point in the different direction.

* * * * *